(12) United States Patent
Park et al.

(10) Patent No.: US 11,164,040 B2
(45) Date of Patent: Nov. 2, 2021

(54) OPERATION DEVICE OF CONVOLUTIONAL NEURAL NETWORK AND OPERATION METHOD THEREOF

(71) Applicant: Korea University Research and Business Foundation, Seoul (KR)

(72) Inventors: Jongsun Park, Seoul (KR); Dong Yeob Shin, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 184 days.

(21) Appl. No.: 16/660,026

(22) Filed: Oct. 22, 2019

(65) Prior Publication Data
US 2020/0202162 A1     Jun. 25, 2020

(30) Foreign Application Priority Data
Dec. 19, 2018 (KR) .......................... 10-2018-0165216

(51) Int. Cl.
*G06K 9/62* (2006.01)
*G06N 3/04* (2006.01)

(52) U.S. Cl.
CPC ............. *G06K 9/623* (2013.01); *G06K 9/629* (2013.01); *G06N 3/04* (2013.01)

(58) Field of Classification Search
CPC ...... G06K 9/623; G06K 9/629; G06K 9/4628; G06K 9/6274; G06N 3/04; G06N 3/0454; G06N 3/063; G06F 17/153
See application file for complete search history.

(56) References Cited

U.S. PATENT DOCUMENTS

| 9,449,257 B2 | 9/2016 | Shi et al. | |
| 2018/0150721 A1* | 5/2018 | Mostafa | ................. G06N 3/063 |
| 2020/0210806 A1* | 7/2020 | Lee | ......................... G06N 3/063 |
| 2020/0401895 A1* | 12/2020 | Litvak | .................... G06F 17/153 |

FOREIGN PATENT DOCUMENTS

| KR | 10-2012-0111516 A | 10/2012 |
| KR | 10-2016-0142791 A | 12/2016 |
| KR | 10-1833359 B1 | 2/2018 |
| KR | 10-2018-0060149 A | 6/2018 |
| KR | 10-2018-0107869 A | 10/2018 |
| KR | 10-2018-0117017 A | 10/2018 |

OTHER PUBLICATIONS

Kim, Cheolhwan et al., "Mosaic-CNN: A Combined Two-Step Zero Prediction Approach to Trade off Accuracy and Computation Energy in Convolutional Neural Networks", *IEEE Journal on Emerging and Selected Topics in Circuits and Systems*, vol. 8, Issue 4, Dec. 2018 (pp. 770-781).
Korean Office Action dated Apr. 23, 2020 in corresponding Korean Patent Application No. 10-2018-0165216 (6 pages in Korean).

* cited by examiner

*Primary Examiner* — Dhaval V Patel
(74) *Attorney, Agent, or Firm* — NSIP Law

(57) ABSTRACT

An operation device of a convolutional neural network includes a first operation unit performing a convolution operation on an input feature map based on a predetermined mosaic type to output at least one pixel information of an output feature map, a prediction unit predicting the other pixel information of the output feature map as one of a skip pixel and an operation pixel based on the at least one pixel information, and a second operation unit skipping the convolution operation with respect to the sip pixel to process the skip pixel as an output of zero.

13 Claims, 12 Drawing Sheets

(a)

(b)

(c)

(d)

(e)

(f)

(g)

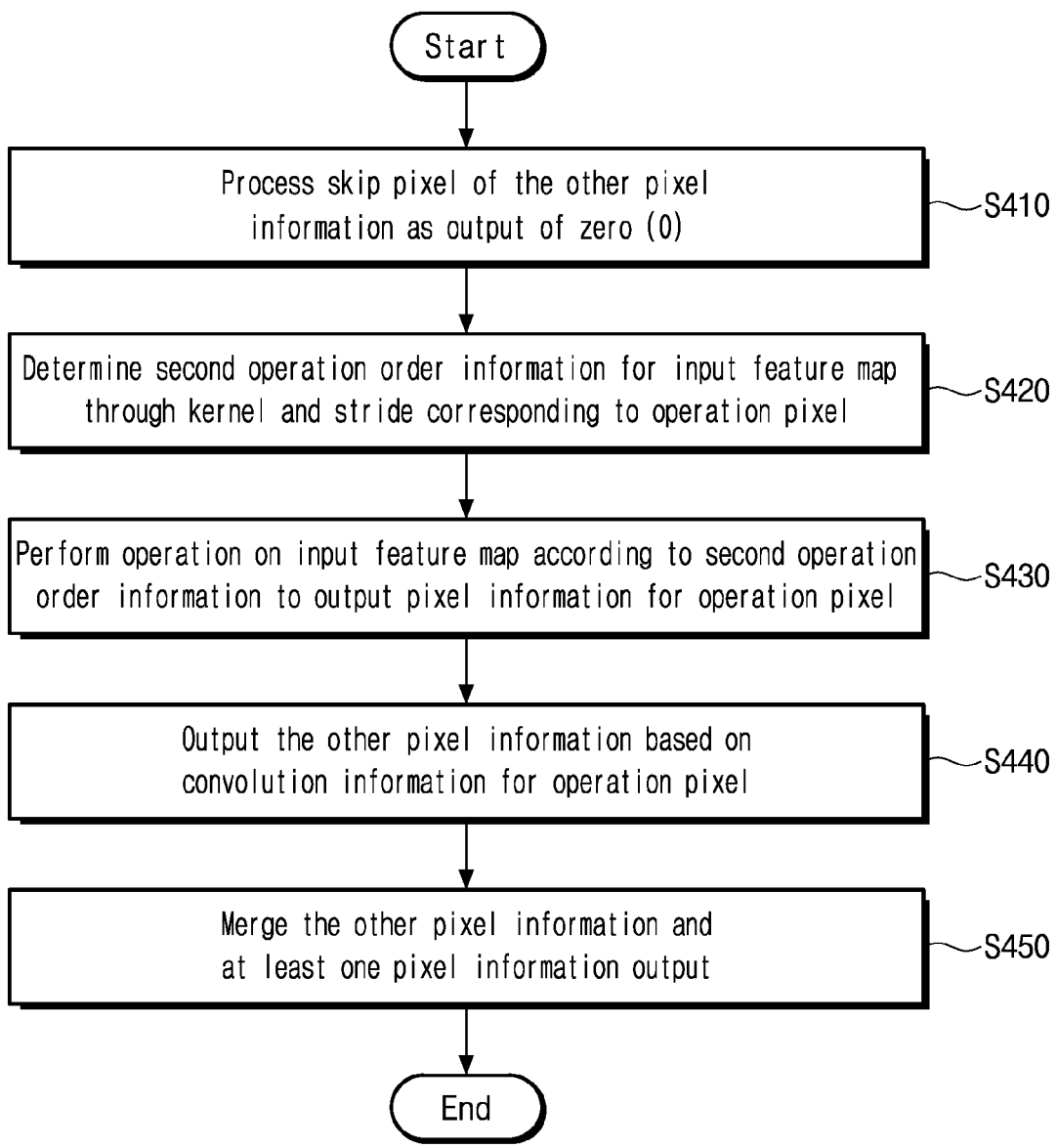

OPERATION DEVICE OF CONVOLUTIONAL NEURAL NETWORK AND OPERATION METHOD THEREOF

CROSS-REFERENCE TO RELATED APPLICATION

This U.S. non-provisional patent application claims priority under 35 U.S.C. § 119 of Korean Patent Application No. 10-2018-0165216, filed on Dec. 19, 2018, the contents of which are hereby incorporated by reference in its entirety.

BACKGROUND

1. Field of Disclosure

The present disclosure relates to an operation device of a convolutional neural network and an operation method thereof. More particularly, the present disclosure relates to an operation device of a convolutional neural network, which is capable of predicting an output of zero (0) in an output feature map to skip some operations on an input feature map, and an operation method thereof.

2. Description of the Related Art

In recent years, artificial neural networks are one of the most prominent technologies. A convolutional neural network (hereinafter, referred to as "CNN"), which is a core computational model of deep learning technologies, is a kind of artificial neural networks in which each neuron is arranged in multiple layers to have characteristics similar to the response characteristics of an overlap region in a human visual system.

The CNN has an advantage of recognizing image and audio of a complex pattern with high recognition rate as the number of the layers increases. Accordingly, recently, an image and audio recognition rate that remains in stagnant state for a long time dramatically increases by the CNN technology, and CNN systems break the highest record of the image recognition rate in various image recognition benchmarking tests such as the ImageNet Challenge. As a result, the CNN is being spotlighted in various machine learning fields, such as image recognition, audio recognition, and language translation.

In particular, since the CNN calculates multiple levels of convolutional layers, power energy is significantly consumed. In addition, the convolutional layer includes a convolution operation result output through the convolution operation between an input feature map and a filter coefficient and an output feature map output by activating the convolution operation result through a non-linear activation function.

Accordingly, in the present application, a method to reduce the energy consumed in calculating the convolutional layers in a hardware device using the CNN is suggested.

SUMMARY

The present disclosure provides an operation device of a convolutional neural network, which is capable of accurately predicting an output of zero (0) in an output feature map and skipping an operation on pixels of an input feature map corresponding to the output of zero (0), and an operation method thereof.

The present disclosure provides an operation method of the operation device of the convolutional neural network.

Embodiments of the inventive concept provide an operation device for a convolutional neural network including a first operation unit performing a convolution operation on an input feature map based on a predetermined mosaic type to output at least one pixel information of an output feature map, a prediction unit predicting the other pixel information of the output feature map as one of a skip pixel and an operation pixel based on the at least one pixel information, and a second operation unit skipping the convolution operation with respect to the skip pixel to process the skip pixel as an output of zero.

The first operation unit detects a predetermined prediction pattern based on the predetermined mosaic type.

The first operation unit determines first operation order information for the input feature map through a kernel and a stride, which correspond to the prediction pattern, and the first operation order information are operation order information for the stride determined according to the prediction pattern.

The first operation unit performs a convolution operation on the input feature map and the kernel according to the first operation order information to output the at least one pixel information of the output feature map.

When a convolution operation is performed on a most significant bit of the input feature map and a filter coefficient predetermined in the kernel, the first operation unit performs a convolution operation on lower bits of the input feature map and the predetermined filter coefficient to weight the operated result with a correction constant.

The operation device further includes a sparse matrix accelerator that performs a convolution operation on a next input feature map based on the output of zero of the output feature map. The sparse matrix accelerator performs the convolution operation on the next input feature map through a kernel and a stride, which correspond to the pixel information except for the output of zero.

The prediction unit predicts a first area of the other output information, which is predetermined according to the prediction pattern, as the skip pixel depending on whether an output pattern of zero of the at least one pixel information is equal to the prediction pattern.

The at least one pixel information is a $C_{NM}$ pixel matrix operated according to the prediction pattern, "C" denotes a pixel matrix corresponding to the output feature map, "N" denotes position information on an X-axis of the pixel matrix, and "M" denotes position information on a Y-axis of the pixel matrix.

The prediction pattern is a matrix having the pixel information in positions of C11, C13, C15, C31, C33, C35, C51, C53, and C55.

The prediction pattern is a matrix having the pixel information in positions of C11, C14, C22, C25, C33, C36, C41, C44, C52, C55, C63, and C66.

The prediction pattern is a matrix having the pixel information in positions of C11, C13, C15, C22, C24, C26, C31, C33, C35, C42, C44, C46, C51, C53, C55, C62, C64, and C66.

The prediction pattern is a matrix having the pixel information in positions of C11, C14, C22, C25, C33, C36, C43, C46, C52, C55, C61, and C64.

The prediction pattern is a matrix having the pixel information in positions of C11, C13, C15, C22, C24, C26, C32, C34, C36, C41, C43, C45, C51, C53, C55, C62, C64, and C66.

The prediction pattern is a matrix having the pixel information in positions of C11, C12, C14, C15, C22, C23, C25, C26, C31, C33, C34, C36, C41, C43, C44, C46, C52, C53, C55, C56, C61, C62, C64, and C65.

The prediction pattern is a matrix having the pixel information in positions of C11, C12, C14, C15, C22, C23, C25, C26, C31, C33, C34, C36, C41, C42, C44, C45, C52, C53, C55, C56, C61, C62, C64, and C65.

Embodiments of the inventive concept provide an operation method of an operation device of a convolutional neural network including performing a convolution operation on an input feature map based on a predetermined mosaic type to output at least one pixel information of an output feature map, predicting the other pixel information of the output feature map as one of a skip pixel and an operation pixel based on the at least one pixel information, and skipping the convolution operation with respect to the skip pixel to process the skip pixel as an output of zero.

The operation method further includes performing a convolution operation on the input feature map through a kernel and a stride, which correspond to the operation pixel, to output convolution information for the operation pixel and merging the output of zero, the at least one pixel information, and the convolution information with respect to the operation pixel to output the output feature map.

The outputting of the at least one pixel information includes detecting a predetermined prediction pattern based on the predetermined mosaic type, determining first operation order information for the input feature map through a kernel and a stride, which correspond to the prediction pattern, and performing a convolution operation on the input feature map and the kernel according to the first operation order information.

The predicting of the other pixel information includes comparing the at least one pixel information with the prediction pattern, predicting a first area of the other pixel information, which is predetermined according to the prediction pattern, as the skip pixel depending on whether the at least one pixel information are equal to the prediction pattern, and predicting the other area of the other pixel information as the operation pixel.

The processing of the skip pixel as the output of zero includes determining second operation order information for the input feature map through kernel and the stride, which correspond to the operation pixel, performing a convolution operation on the input feature map and the kernel according to the second operation order information to output the convolution information for the operation pixel, outputting the other pixel information based on the convolution information for the operation pixel, and merging the at least one pixel information and the other pixel information to output the output feature map.

According to the above, the operation device of the convolutional neural network and the operation method thereof may reduce a system load and a power consumption, which are caused by the convolutional operation with respect to the input feature map.

BRIEF DESCRIPTION OF THE DRAWINGS

The above and other advantages of the present disclosure will become readily apparent by reference to the following detailed description when considered in conjunction with the accompanying drawings wherein:

FIGS. 5 to 5G are views showing prediction patterns according to a predetermined mosaic type;

FIG. 12 is a flowchart showing an operation of the second operation unit of FIG. 1.

DETAILED DESCRIPTION

Figure 1:
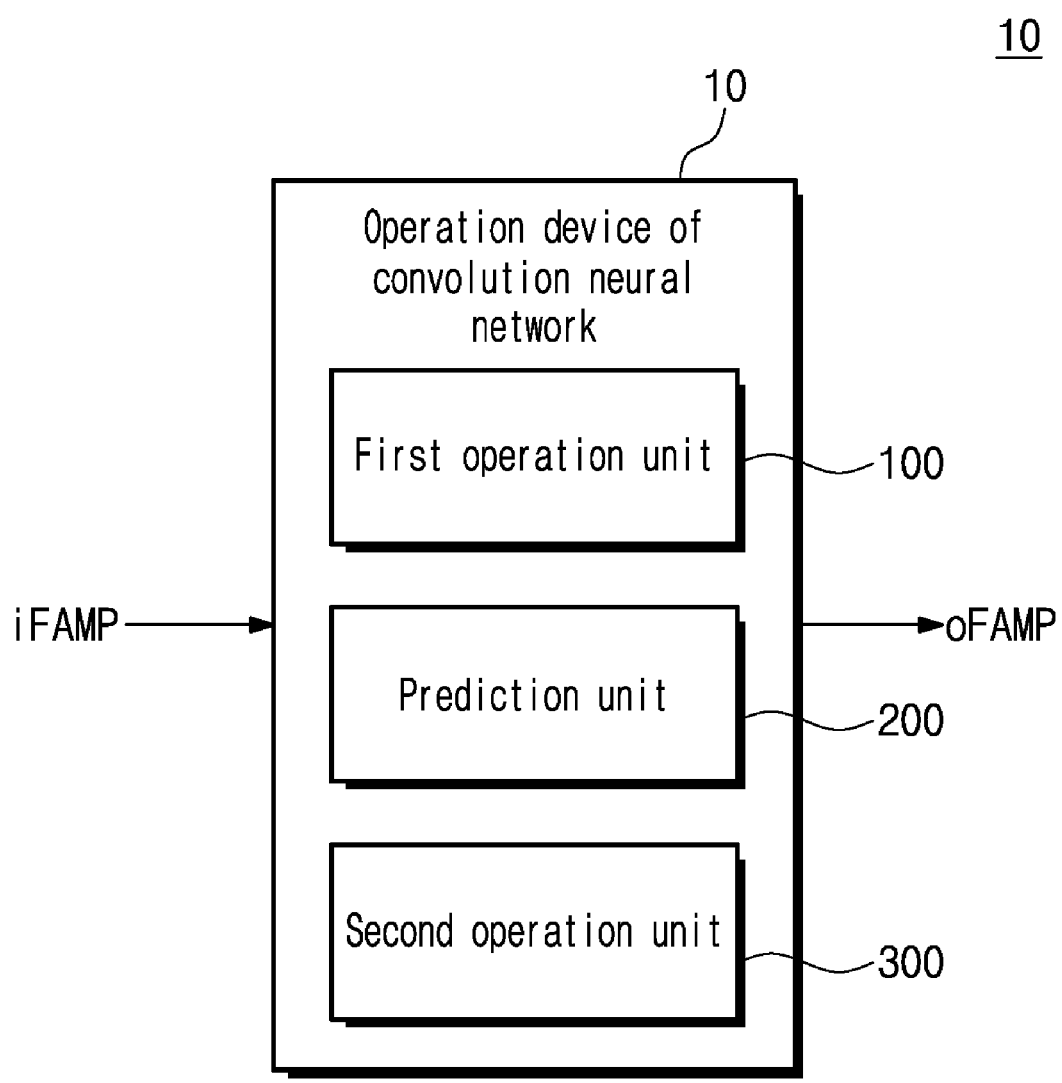
FIG. 1 is a block diagram showing an operation device of a convolutional neural network according to an exemplary embodiment of the present disclosure.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described with reference to accompanying drawings.

Figure 2:
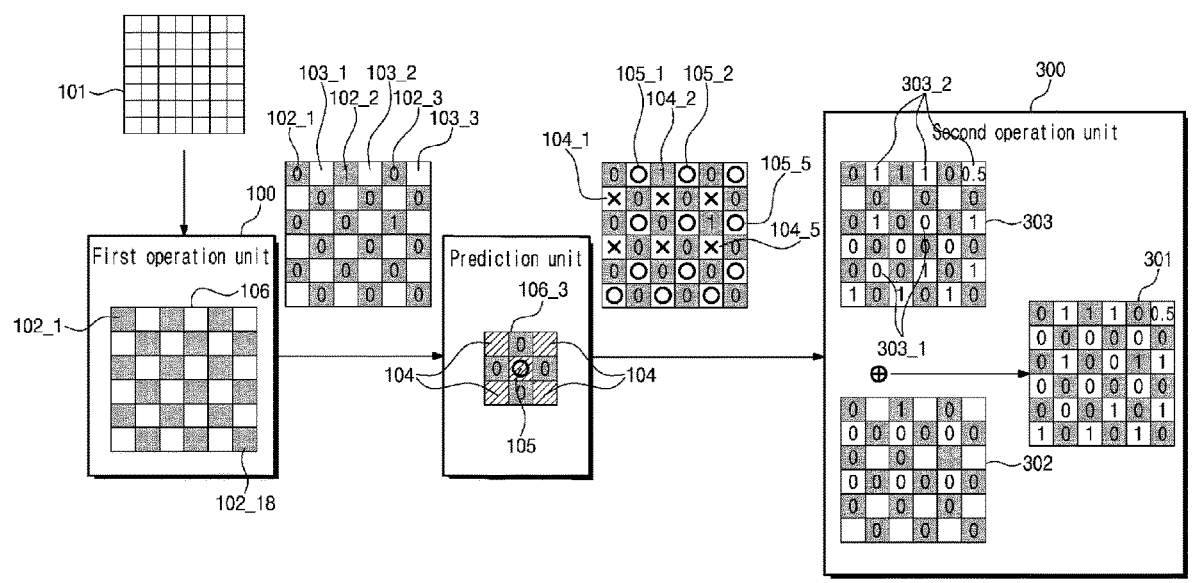
FIG. 2 is a view showing an operation of the operation device of the convolutional neural network of FIG. 1.

FIG. 1 is a block diagram showing an operation device 10 of a convolutional neural network according to an exemplary embodiment of the present disclosure, and FIG. 2 is a view showing an example of an operation of the operation device 10 of the convolutional neural network of FIG. 1.

Referring to FIGS. 1 and 2, the operation device 10 of the convolutional neural network may include a first operation unit 100, a prediction unit 200, and a second operation unit 300.

The first operation unit 100 may perform a convolution operation on an input feature map (iFMAP) 101 based on a predetermined mosaic type 106. In the present exemplary embodiment, the predetermined mosaic type 106 may be a pixel matrix that defines prediction pattern (e.g., 106_1 to 106_7) for predicting adjacent zero pixels of an output feature map 301.

As shown in FIG. 2, the input feature map 101 may be input data having a pixel matrix form. For example, a controller or a central processing unit may generate or receive the input feature map 101 and may store the input feature map 101 in a memory, a storage unit, or a cloud server. That is, the first operation unit 100 may receive the input feature map 101 stored in the memory or the cloud server or generated by the controller or the central processing unit to perform the convolution operation.

The first operation unit 100 according to the exemplary embodiment may perform the convolution operation on the input feature map 101 based on the predetermined mosaic type 106 and may output at least one pixel 102_1 to 102_N of the output feature map (oFMAP) 301. In this case, a matrix size of the predetermined mosaic type 106 may be a size corresponding to the output feature map 301. The prediction pattern (e.g., 106_1 to 106_7) according to the predetermined mosaic type 106 will be described in detail with reference to FIGS. 5A to 5G.

In more detail, the first operation unit 100 may detect a predetermined prediction pattern (e.g., 106_1 to 106_7) of the output feature map 301 based on the predetermined mosaic type 106. For example, the first operation unit 100 may detect the predetermined prediction pattern (e.g., 106_3) of the output feature map 301 as a grid pattern based on the predetermined mosaic type 106 as shown in FIG. 2.

Then, the first operation unit 100 may determine first operation order information for the input feature map 101 through a kernel 121(refer to FIG. 3) and a stride, which correspond to the prediction pattern (e.g., 106_1 to 106_7) of the output feature map 301.

In the present exemplary embodiment, the kernel 121 is a pixel matrix to perform filtering and convolution operations on the input feature map 101. In addition, the stride is operation information to change the number of pixels of the output feature map 301. The first operation order information may be operation order information with respect to the stride to sequentially perform the convolution operation on the kernel 121 and the input feature map 101 according to the prediction pattern (e.g., 106_1 to 106_7). That is, the first operation order information may be information in which an operation order between the input feature map 101 and the kernel 121 is correlated with one pixel information of the output feature map 301.

Hereinafter, the first operation order information will be described in detail with reference to FIG. 3.

Figure 3:
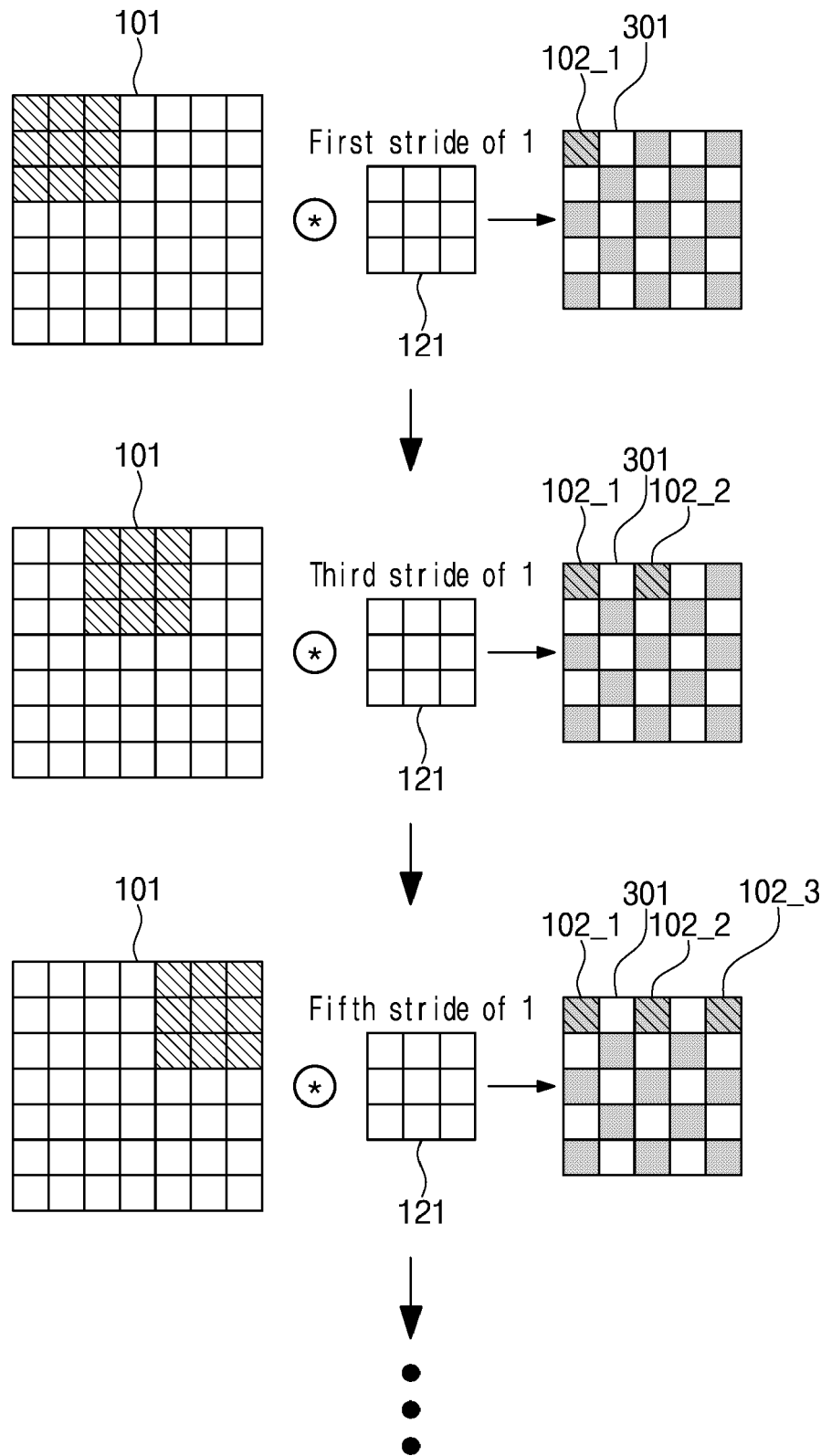
FIG. 3 is a view showing an operation of a first operation unit of FIG. 1.

FIG. 3 is a view showing an example of the operation of the first operation unit 100 of FIG. 1.

As shown in FIG. 3, when the input feature map 101 is a seven by seven (7×7) pixel matrix, the kernel 121 is a three by three (3×3) pixel matrix, the stride is one (1), the output feature map 301 is a five by five (5×5) pixel matrix, and the predetermined prediction pattern (e.g., 106_3) of the output feature map 301 is the grid pattern, the first operation unit 100 may determine the first operation order information.

In more detail, the first operation unit 100 may determine the first operation order information to perform the convolution operation on the input feature map 101 and the kernel 121 for each stride order corresponding to the grid pattern. For example, the first operation order information may include the order information such as a first stride of 1, a third stride of 1, and a fifth stride of 1. That is, the first operation order information may include the order information of 13 strides corresponding to the grid pattern.

Referring to FIGS. 1 and 2 again, the first operation unit 100 may vary the first operation order information for the input feature map 101 through the kernel 121 and the stride, which correspond to the prediction pattern (e.g., 106_1 to 106_7) of the predetermined mosaic type 106. That is, in the first operation order information for the input feature map 101, the operation order of the stride may vary depending on the prediction pattern (e.g., 106_1 to 106_7).

In this case, the first operation unit 100 may perform the convolution operation on the input feature map 101 according to the first operation order information and may output at least one pixel information 102_1 to 102_N of the output feature map 301.

According to the exemplary embodiment, when performing the convolution operation on the input feature map 101, the first operation unit 100 may perform the convolution operation on lower bits of the input feature map 101 and a predetermined filter coefficient to determine the operated result as a correction constant. In this case, the first operation unit 100 may weight the most significant bit of the input feature map 101 and the filter coefficient predetermined in the kernel 121 with the correction constant.

That is, the first operation unit 100 may perform the convolution operation on the input feature map 101 and the kernel 121, which correspond to the prediction pattern (e.g., 106_1 to 106_7) of the output feature map 301, according to the first operation order information and may output at least one pixel information 102_1 to 102_N of the output feature map 301.

The at least one pixel information 102_1 to 102_N of the output feature map 301 is a $C_{NM}$ pixel matrix obtained by the convolution operation according to the prediction pattern (e.g., 106_1 to 106_7) of the predetermined mosaic type 106. In the $C_{NM}$ pixel matrix, "C" denotes the pixel matrix with respect to the output feature map 301, "N" denotes position information on an X-axis of the $C_{NM}$ pixel matrix, and "M" denotes position information on a Y-axis of the $C_{NM}$ pixel matrix.

Then, the prediction unit 200 may predict the other pixel information 103_1 to 103_N of the output feature map 301 as either skip pixel 104_1 to 104_N or operation pixel 105_1 to 105_N based on the at least one pixel information 102_1 to 102_N of the output feature map 301.

In more detail, the prediction unit 200 may receive the at least one pixel information 102_1 to 102_N and the prediction pattern (e.g., 106_1 to 106_7) according to the predetermined mosaic type 106 from the first operation unit 100.

After that, the prediction unit 200 may compare the at least one pixel information 102_1 to 102_N with the prediction pattern (e.g., 106_1 to 106_7). For example, the prediction unit 200 may determine whether the pixel information of zero (0) among the at least one pixel information 102_1 to 102_N are equal to the pixel information of zero (0) of the prediction pattern (e.g., 106_1 to 106_7).

In this case, the prediction unit 200 may predict the pixel information, which are located in a first area 104 predetermined according to the prediction pattern (e.g., 106_1 to 106_7), among the other pixel information 103_1 to 103_N as the skip pixel 104_1 to 104_N depending on whether the at least one pixel information 102_1 to 102_N and the prediction pattern (e.g., 106_1 to 106_7) are equal to each other. That is, in the case where the pixel information of zero (0) among the at least one pixel information 102_1 to 102_N are equal to the pixel information of zero (0) of the prediction pattern (e.g., 106_1 to 106_7), the prediction unit 200 may predict the pixel information, which are located in the first area 104 predetermined according to the prediction pattern (e.g., 106_1 to 106_7), among the other pixel information 103_1 to 103_N as the skip pixel 104_1 to 104_N.

In addition, the prediction unit 200 may predict the pixel information, which are located in the other area 105, among the other pixel information 103_1 to 103_N as the operation pixel 105_1 to 105_N. In the present exemplary embodiment, the first area 104 and the other area 105 may be defined adjacent to each other. That is, the prediction unit 200 may predict the other pixel information 103_1 to 103_N as either the skip pixel 104_1 to 104_N or the operation pixel 105_1 to 105_N based on the at least one pixel information 102_1 to 102_N of the output feature map 301.

For example, as shown in FIG. 2, in the case where the pixel information of zero (0) among the at least one pixel information 102_1 to 102_N are equal to a prediction pattern (e.g., 106_3), the prediction unit 200 may predict the pixel information, which are located in the first area 104 predetermined according to the prediction pattern (e.g., 106_3), among the other pixel information 103_1 to 103_N as the skip pixel 104_1 to 104_N. In this case, the prediction unit 200 may predict the pixel information, which are located in the other area 105, as the operation pixel 105_1 to 105_N.

In addition, in the case where the pixel information of zero (0) among the at least one pixel information 102_1 to 102_N are not equal to the prediction pattern (e.g., 106_3), the prediction unit 200 may predict the pixel information, which are located in the first area 104 and the other area 105, among the other pixel information 103_1 to 103_N as the operation pixel 105_1 to 105_N.

The second operation unit 300 according to the exemplary embodiment may skip the convolution operation with respect to the skip pixel 104_1 to 104_N predicted by the prediction unit 200 and may process the skip pixel 104_1 to 104_N as an output of zero (0) (e.g., 302). In more detail, when one pixel information of the other pixel information 103_1 to 103_N are predicted as the skip pixel 104_1 to 104_N by the prediction unit 200, the second operation unit 300 may skip the convolution operation with respect to the one pixel information and may process the one pixel information as the output of zero (0) (e.g., 302). That is, the second operation unit 300 may process the skip pixel 104_1 to 104_N among the other pixel information 103_1 to 103_N of the output feature map 301 as the output of zero (0) (e.g., 302).

In addition, the second operation unit 300 may determine second operation order information for the operation pixel 105_1 to 105_N through the kernel 121 and the stride, which correspond to the operation pixel 105_1 to 105_N predicted by the prediction unit 200. The second operation order information may be operation order information with respect to the stride between the kernel 121 and the input feature map 101 to sequentially operate the kernel 121 and the stride according to the operation pixel 105_1 to 105_N.

Then, the second operation unit 300 may perform the convolution operation on the input feature map 101 and the kernel 121 according to the second operation order information and may output convolution information (e.g., 303) with respect to the operation pixel 105_1 to 105_N among the other pixel information 103_1 to 103_N of the output feature map 301.

According to the exemplary embodiment, the second operation unit 300 may process the skip pixel 104_1 to 104_N of the other pixel information 103_1 to 103_N of the output feature map 301 as the output of zero (0) (e.g., 302) and, substantially simultaneously, may perform the convolution operation on the input feature map 101 and the kernel 121 according to the second operation order information to output the convolution information (e.g., 303) with respect to the operation pixel 105_1 to 105_N. In this case, the convolution information (e.g., 303) with respect to the operation pixel 105_1 to 105_N may include the operated output of zero (0) (e.g., 303_1) and positive convolution information (e.g., 303_2).

The operation device 10 of the convolutional neural network according to the exemplary embodiment of the present disclosure may perform the convolution operation on the input feature map 101 and the kernel 121 according to the prediction pattern (e.g., 106_1 to 106_7) of the mosaic type 106 predetermined by the first operation unit 100 and may output the at least one pixel information 102_1 to 102_N of the output feature map 301. In this case, the operation device 10 of the convolutional neural network may predict the other pixel information 103_1 to 103_N of the output feature map 301 as either the skip pixel 104_1 to 104_N or the operation pixel 105_1 to 105_N based on the at least one pixel information 102_1 to 102_N using the prediction unit 200. Then, the operation device 10 of the convolutional neural network may skip the convolution operation with respect to the skip pixel 104_1 to 104_N among the other pixel information 103_1 to 103_N of the output feature map 301 using the second operation unit 300 and may process the skip pixel 104_1 to 104_N as the output of zero (0) (e.g., 302). That is, the operation device 10 of the convolutional neural network may accurately predict the skip pixel 104_1 to 104_N based on the prediction pattern (e.g., 106_1 to 106_7) of the output feature map 301. Accordingly, the operation device 10 of the convolutional neural network may skip the convolution operation with respect to the skip pixel 104_1 to 104_N, and thus system load and power consumption, which are caused by the complicated operation of the convolutional neural network, may be reduced.

Hereinafter, the first operation unit 100 of FIG. 1 will be described in more detail with reference to FIG. 4.

Figure 4:
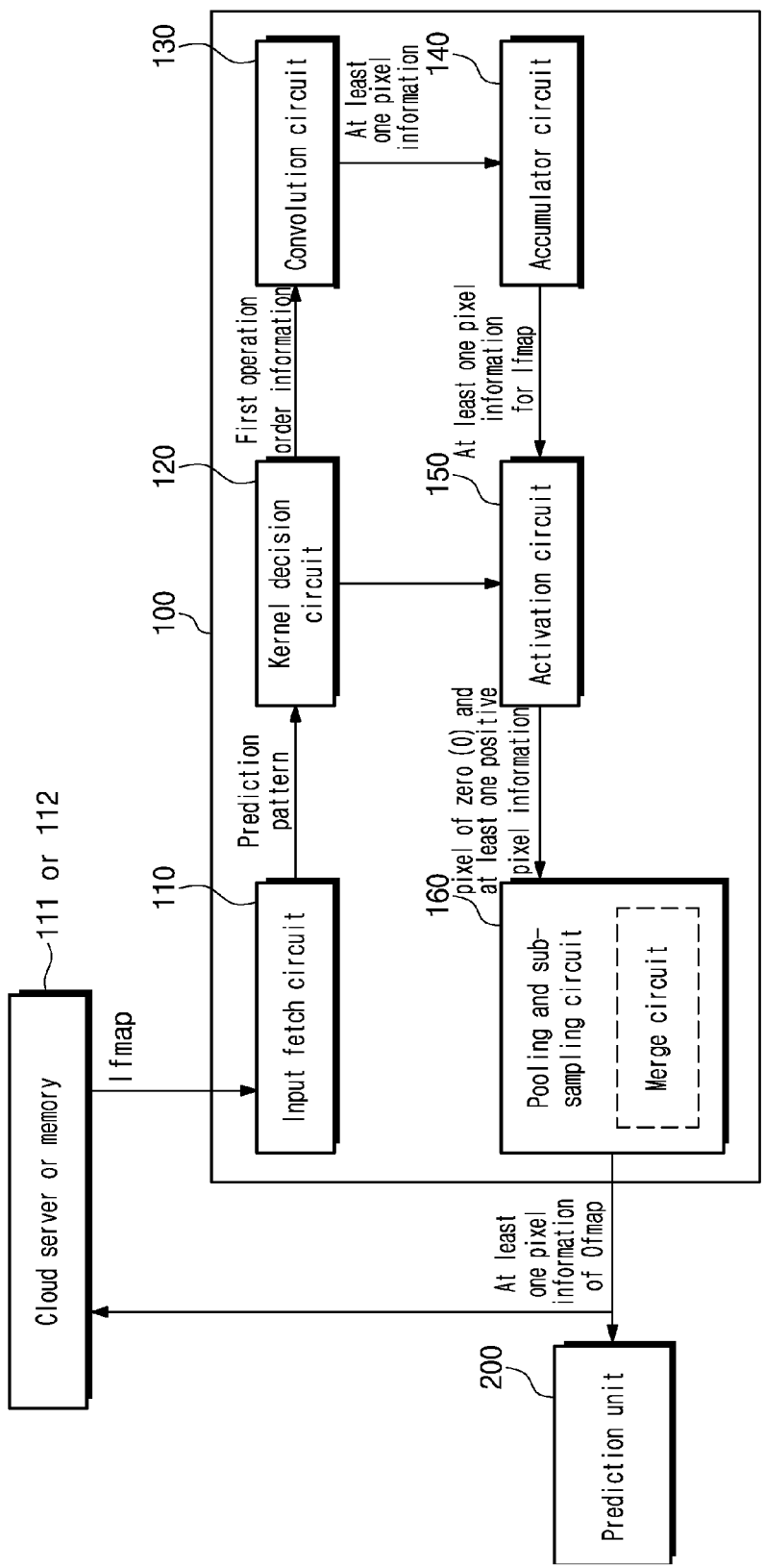
FIG. 4 is a block diagram showing the first operation unit of FIG. 1.

FIG. 4 is a block diagram showing a configuration of the first operation unit 100 of FIG. 1.

Referring to FIGS. 1 to 4, the first operation unit 100 may include an input fetch circuit 110, a kernel decision circuit 120, a convolution circuit 130, an accumulator circuit 140, an activation circuit 150, and a pooling and sub-sampling circuit 160.

In more detail, the input fetch circuit 110 may detect the input feature map 101 from an external cloud server 111 or an internal memory 112. The external cloud server 111 or the internal memory 112 may receive the input feature map 101 and may store the input feature map 101 in the matrix form by the central processing unit or the controller that extracts features of input data.

In addition, the input fetch circuit 110 may detect the predetermined mosaic type 106 from the external cloud server 111 or the internal memory 112. Then, the input fetch circuit 110 may detect the prediction pattern (e.g., 106_1 to 106_7) of the output feature map 301 that is previously determined according to the predetermined mosaic type 106. In this case, the prediction pattern (e.g., 106_1 to 106_7) may be the pixel matrix having the size corresponding to that of the pixel matrix of the output feature map 301.

Figure 5:
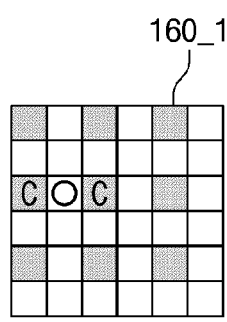
Figure 5:
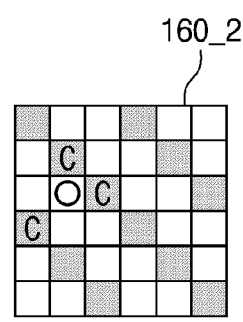
Figure 5:
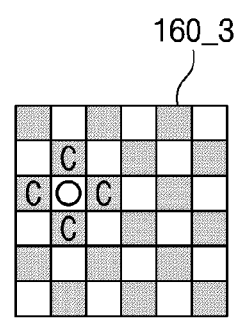
Figure 5:
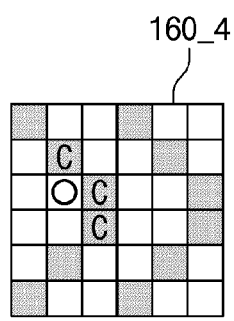
Figure 5:
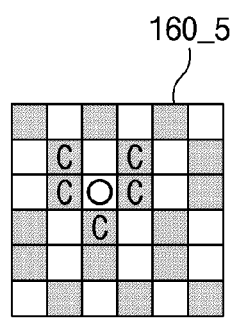
Figure 5:
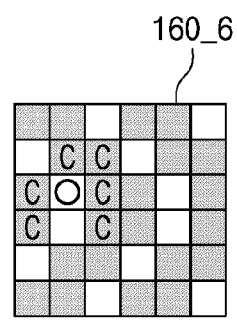
Figure 5:
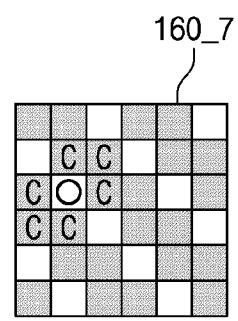

Hereinafter, the prediction pattern (e.g., 106_1 to 106_7) detected according to the predetermined mosaic type 106 will be described in detail with reference to FIG. 5.

FIG. 5A shows an exemplary embodiment of the prediction pattern 106_1 according to a first mosaic type.

Referring to FIGS. 1 to 4 and 5A, when the predetermined mosaic type 106 corresponds to the first mosaic type and the output feature map 301 is a six by six (6×6) pixel matrix ($C_{NM}$), the prediction pattern 106_1 may be the matrix having the pixel information in positions of C11, C13, C15, C31, C33, C35, C51, C53, and C55. In the present exemplary embodiment, "C" denotes the matrix information of the output feature map 301, "N" denotes the position information on the X-axis of the matrix information of the output feature map 301, and "M" denotes the position information on the Y-axis of the matrix information of the output feature map 301.

FIG. 5B shows an exemplary embodiment of the prediction pattern 106_2 according to a second mosaic type.

Referring to FIGS. 1 to 4 and 5B, when the predetermined mosaic type 106 corresponds to the second mosaic type and the output feature map 301 is the six by six (6×6) pixel matrix ($C_{NM}$), the prediction pattern 106_2 may be the matrix having the pixel information in positions of C11, C14, C22, C25, C33, C36, C41, C44, C52, C55, C63, and C66.

FIG. 5C shows an exemplary embodiment of the prediction pattern 106_3 according to a third mosaic type.

Referring to FIGS. 1 to 4 and 5C, when the predetermined mosaic type 106 corresponds to the third mosaic type and the output feature map 301 is the six by six (6×6) pixel matrix ($C_{NM}$), the prediction pattern 106_3 may be the matrix having the pixel information in positions of C11, C13, C15, C22, C24, C26, C31, C33, C35, C42, C44, C46, C51, C53, C55, C62, C64, and C66.

FIG. 5D shows an exemplary embodiment of the prediction pattern 106_4 according to a fourth mosaic type.

Referring to FIGS. 1 to 4 and 5D, when the predetermined mosaic type 106 corresponds to the fourth mosaic type and the output feature map 301 is the six by six (6×6) pixel matrix ($C_{NM}$), the prediction pattern 106_4 may be the matrix having the pixel information in positions of C11, C14, C22, C25, C33, C36, C43, C46, C52, C55, C61, and C64.

FIG. 5E shows an exemplary embodiment of the prediction pattern 106_5 according to a fifth mosaic type.

Referring to FIGS. 1 to 4 and 5E, when the predetermined mosaic type 106 corresponds to the fifth mosaic type and the output feature map 301 is the six by six (6×6) pixel matrix ($C_{NM}$), the prediction pattern 106_5 may be the matrix having the pixel information in positions of C11, C13, C15, C22, C24, C26, C32, C34, C36, C41, C43, C45, C51, C53, C55, C62, C64, and C66.

FIG. 5F shows an exemplary embodiment of the prediction pattern 106_6 according to a sixth mosaic type.

Referring to FIGS. 1 to 4 and 5F, when the predetermined mosaic type 106 corresponds to the sixth mosaic type and the output feature map 301 is the six by six (6×6) pixel matrix ($C_{NM}$), the prediction pattern 106_6 may be the matrix having the pixel information in positions of C11, C12, C14, C15, C22, C23, C25, C26, C31, C33, C34, C36, C41, C43, C44, C46, C52, C53, C55, C56, C61, C62, C64, and C65.

FIG. 5G shows an exemplary embodiment of the prediction pattern 106_7 according to a seventh mosaic type.

Referring to FIGS. 1 to 4 and 5G, when the predetermined mosaic type 106 corresponds to the seventh mosaic type and the output feature map 301 is the six by six (6×6) pixel matrix ($C_{NM}$), the prediction pattern 106_7 may be the matrix having the pixel information in positions of C11, C12, C14, C15, C22, C23, C25, C26, C31, C33, C34, C36, C41, C42, C44, C45, C52, C53, C55, C56, C61, C62, C64, and C65.

Referring to FIGS. 1 to 4, the kernel decision circuit 120 may determine the first operation order information for the input feature map 101 through the kernel 121 and the stride, which correspond to the prediction pattern (e.g., 106_1 to 106_7) detected by the input fetch circuit 110. For example, the kernel decision circuit 120 may determine the stride order between the input feature map 101 and the kernel 121, which correspond to the prediction pattern (e.g., 106_1 to 106_7), as the first operation order information.

Then, the convolution circuit 130 may perform the convolution operation on the input feature map 101 and the kernel 121 according to the first operation order information determined by the kernel decision circuit 120 and may output the at least one pixel information 102_1 to 102_N of the output feature map 301.

The accumulator circuit 140 may classify or group the at least one pixel information 102_1 to 102_N of the output feature map 301 from the convolution circuit 130 into information about the input feature map 101 based on the first operation order information and may output the at least one pixel information 102_1 to 102_N of the output feature map 301 with respect to the input feature map 101 to the activation circuit 150. In this case, the accumulator circuit 140 may accumulate the at least one pixel information 102_1 to 102_N of the output feature map 301, which are operated by or output from the same input feature map 101.

The activation circuit 150 may activate the at least one pixel information 102_1 to 102_N, which are provided from the accumulator circuit 140, according to the first operation order information through a non-linear function. In the present exemplary embodiment, the non-linear function may include a ReLU function. In more detail, in a case where the at least one pixel information 102_1 to 102_N are negative (−), the activation circuit 150 may process the at least one pixel information 102_1 to 102_N as the pixel information of zero (0) through the non-linear function, and in a case where the at least one pixel information 102_1 to 102_N are positive (+), the activation circuit 150 may output the at least one pixel information 102_1 to 102_N as they are.

The pooling and sub-sampling circuit 160 may output the at least one pixel information 102_1 to 102_N with respect to the output feature map 301 through the activation circuit 150. The at least one pixel information 102_1 to 102_N may include the pixel of zero (0) and the at least one positive pixel information 102_1 to 102_N.

The pooling and sub-sampling circuit 160 may store the at least one pixel information 102_1 to 102_N with respect to the output feature map 301 in the external cloud server 111 or the internal memory 112.

According to the exemplary embodiment, the pooling and sub-sampling circuit 160 may sub-sample the at least one pixel information 102_1 to 102_N with respect to the output feature map 301 to convert the at least one pixel information 102_1 to 102_N with respect to the output feature map 301 into a small matrix size.

Hereinafter, the second operation unit 300 will be described in detail with reference to FIG. 6.

Figure 6:
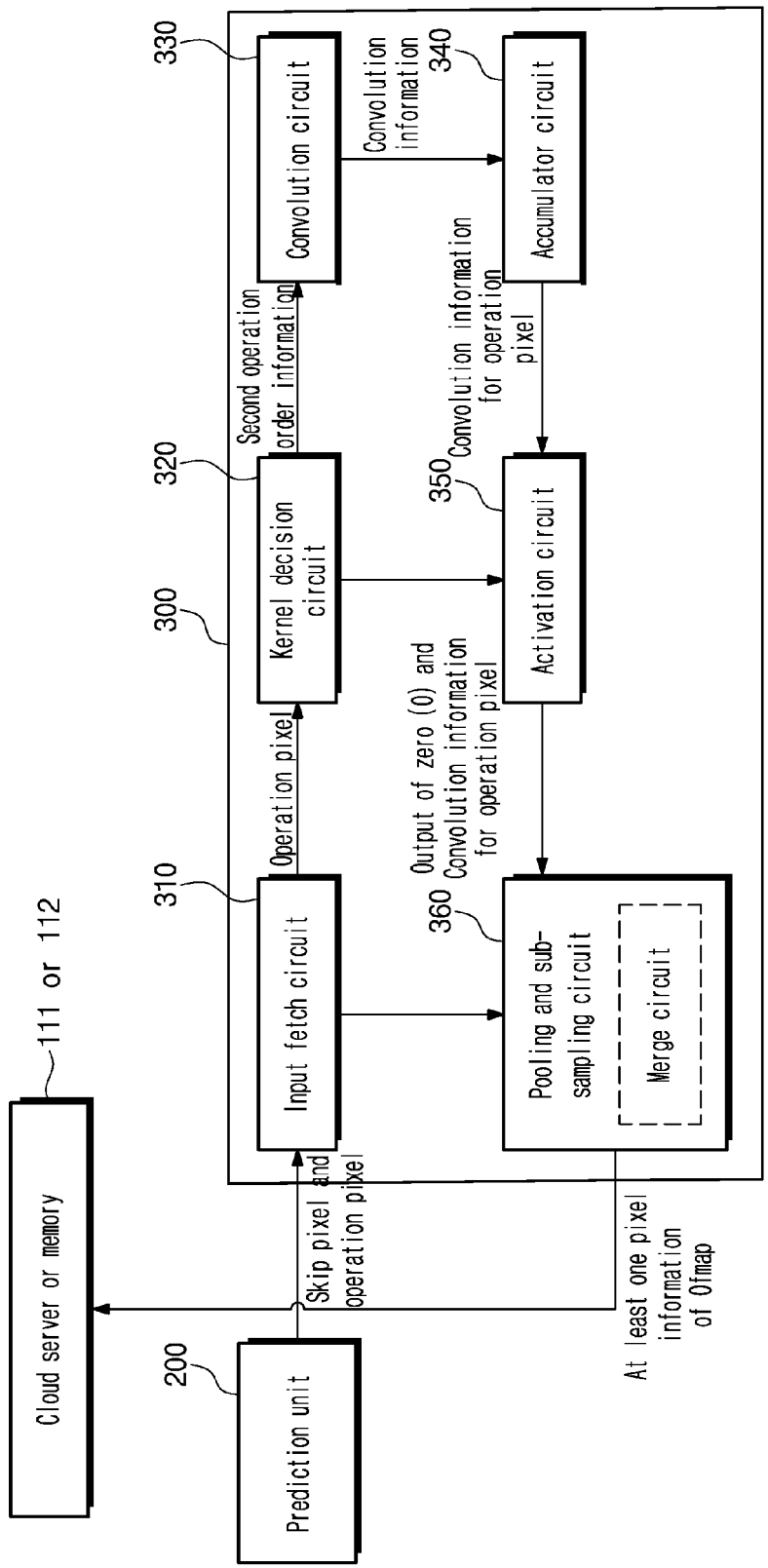
FIG. 6 is a block diagram showing a second operation unit of FIG. 1.

FIG. 6 is a block diagram showing a configuration of the second operation unit 300 of FIG. 1.

Referring to FIGS. 1 to 4 and 6, the second operation unit 300 may include an input fetch circuit 310, a kernel decision circuit 320, a convolution circuit 330, an accumulator circuit 340, an activation circuit 350, and a pooling and sub-sampling circuit 360. In FIG. 6, functions and operations that are the same as described in FIG. 4 will be omitted.

In the present disclosure, the first and second operation units 100 and 300 are described as including the input fetch circuit 110 or 310, the kernel decision circuit 120 or 320, the convolution circuit 130 or 330, the accumulator circuit 140 or 340, the activation circuit 150 or 350, and the pooling and sub-sampling circuit 160 or 360, however, the first and second operation units 100 and 300 may be independently configured according to various embodiments to control the kernel decision circuit 120 or 320, the convolution circuit 130 or 330, the accumulator circuit 140 or 340, the activation circuit 150 or 350, and the pooling and sub-sampling circuit 160 or 360.

The input fetch circuit 310 may process the skip pixel 104_1 to 104_N of the output feature map 301 predicted by the prediction unit 200 as the output of zero (0). That is, the skip pixel 104_1 to 104_N of the output feature map 301 predicted by the prediction unit 200 may be processed as the output of zero (0) (e.g., 302) without performing operations of the kernel decision circuit 320, the convolution circuit 330, the accumulator circuit 340, the activation circuit 350, and the pooling and sub-sampling circuit 360.

Then, the kernel decision circuit 320 may determine the second operation order information for the input feature map 101 through the kernel 121 and the stride, which correspond to the operation pixel 105_1 to 105_N of the output feature map 301 predicted by the prediction unit 200.

The convolution circuit 330 may perform the convolution operation on the input feature map 101 and the kernel 121 according to the second operation order information determined by the kernel decision circuit 320 and may output the convolution information (e.g., 303) for the operation pixel 105_1 to 105_N.

The accumulator circuit 340 may classify or group the convolution information (e.g., 303) into the convolution information (e.g., 303) with respect to the input feature map 101 based on the second operation order information and may output the convolution information (e.g., 303) with respect to the operation pixel 105_1 to 105_N among the other pixel information 103_1 to 103_N to the activation circuit 350.

The activation circuit 350 may activate the convolution information (e.g., 303) with respect to the operation pixel 105_1 to 105_N, which are provided from the accumulator circuit 340, according to the second operation order information through a non-linear function and may transmit an output of zero (0) (e.g., 303_1) and positive convolution information (e.g., 303_2) to the pooling and sub-sampling circuit 360.

The pooling and sub-sampling circuit 360 may accumulate the output of zero (0) (e.g., 303_1) and the positive convolution information (e.g., 303_2) with respect to the operation pixel 105_1 to 105_N provided thereto through the activation circuit 350, and the output of zero (0) (e.g., 302) with respect to the skip pixel 104_1 to 104_N processed by the input fetch circuit 310 to output the other pixel information 103_1 to 103_N of the output feature map 301. Then, the pooling and sub-sampling circuit 360 may store the other pixel information 103_1 to 103_N of the output feature map 301 in the external cloud server 111 or the internal memory 112.

According to the exemplary embodiment, the pooling and sub-sampling circuit 360 may further include a merge circuit 361.

The merge circuit 361 may receive the at least one pixel information 102_1 to 102_N of the output feature map 301 through the pooling and sub-sampling circuit 160 of the first operation unit 100 and may receive the other pixel information 103_1 to 103_N of the output feature map 301 through the pooling and sub-sampling circuit 360 of the second operation unit 300. In this case, the merge circuit 361 may merge the at least one pixel information 102_1 to 102_N and the other pixel information 103_1 to 103_N of the output feature map 301 and may store the output feature map 301 in the external cloud server 111 or the internal memory 112.

According to the exemplary embodiment, the merge circuit 361 may detect the at least one pixel information 102_1 to 102_N of the output feature map 301 stored in the external cloud server 111 or the internal memory 112.

Accordingly, when the skip pixel of the output feature map 301 is processed as the output of zero (0) (e.g., 302) by the input fetch circuit 310, the second operation unit 300 may process the operation pixel 105_1 to 105_N of the output feature map 301 in parallel through the kernel decision circuit 320, the convolution circuit 330, the accumulator circuit 340, the activation circuit 350, and the pooling and sub-sampling circuit 360 to output the output feature map 301.

Figure 7:
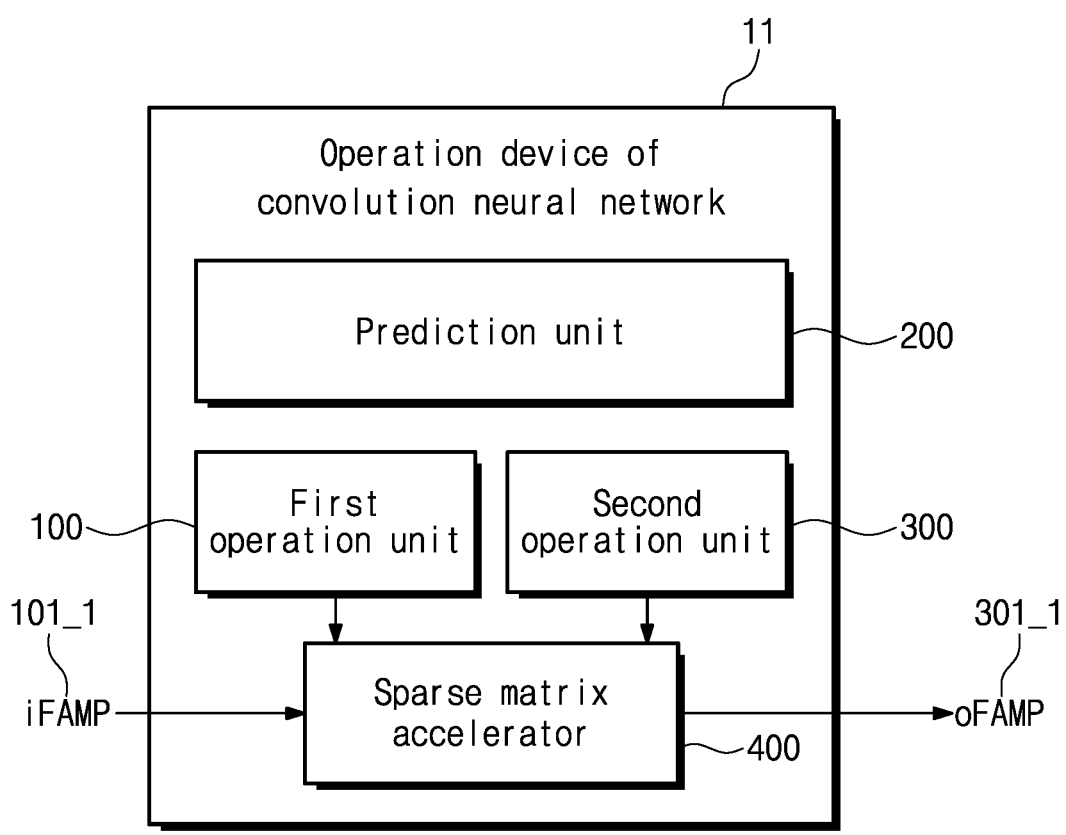
FIG. 7 is a block diagram showing an operation device of a convolutional neural network according to another exemplary embodiment of the present disclosure.

FIG. 7 is a block diagram showing an operation device 11 of a convolutional neural network according to another exemplary embodiment of the present disclosure.

Referring to FIG. 7, the operation device 11 of the convolutional neural network may include a first operation unit 100, a prediction unit 200, a second operation unit 300, and a sparse matrix accelerator 400. The first operation unit 100, the prediction unit 200, and the second operation unit 300 have substantially the same functions, structures, and operations as described in FIGS. 1 to 6, and thus details thereof will be omitted hereinafter.

The sparse matrix accelerator 400 may store an output feature map 301 output according to a predetermined mosaic type 106 through the first and second operation units 100 and 300. In this case, the sparse matrix accelerator 400 may determine a third operation order information through a kernel 121 and a stride, which correspond to pixel information except for an output of zero (0) in the output feature map 301. In the present exemplary embodiment, the third operation order information may be order information depending on a stride size to sequentially accelerate and operate the kernel 121 and the stride in accordance with the pixel information in the output feature map 301 rather than the output of zero (0).

The sparse matrix accelerator 400 may perform the convolution operation on a next input feature map 101_1 newly generated in the cloud server 111 or the memory 112 according to the third operation order information. That is, the sparse matrix accelerator 400 may perform the convolution operation on the next input feature map 101_1 and the kernel 121 according to the third operation order information and may output an output feature map 301_1 more quickly.

Figure 8:
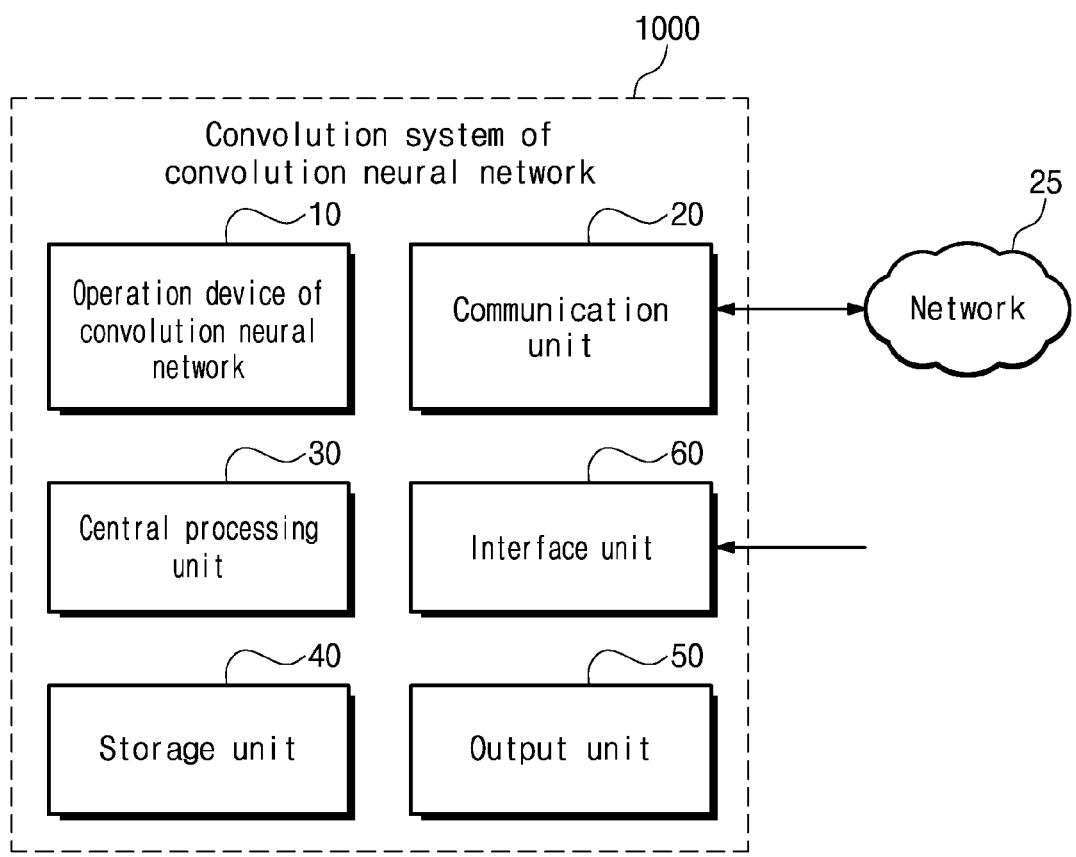
FIG. 8 is a block diagram showing a convolution system for a convolutional neural network.

FIG. 8 is a block diagram showing a convolution system 1000 of a convolutional neural network.

Referring to FIGS. 1 to 8, the convolution system 1000 of the convolutional neural network may include an operation device 10 of the convolutional neural network, a communication unit 20, a central processing unit 30, a storage unit 40, and an output unit 50.

The operation device 10 of the convolutional neural network may be implemented by a Graphics Processing Unit (GPU) mounted in a hardware chip form to perform functions and operations described in FIGS. 1 to 7. For example, the operation device 10 of the convolutional neural network may be implemented by a processor, such as a Central Processing Unit (CPU), a Microprocessor, an Application-Specific Integrated Circuit (ASIC), and Field Programmable Gate Arrays (FPGA). In addition, the operation device 10 of the convolutional neural network may be implemented with an intelligent semiconductor such as a Processor-In-Memory (PIM).

The communication unit 20 may receive the input feature map 101 and transmit the output feature map 301 through a network 25. For example, the communication device 20 may receive the input feature map 101 and transmit the output feature map 301 through at least one wireless communication interface, such as LTE, LTE-Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM). In addition, the communication unit 20 may receive the input feature map 101 and transmit the output feature map 301 through at least one short-range communication interface, such as Wireless Fidelity (WiFi), Bluetooth, Bluetooth Low Energy (BLE), Zigbee, Near Field Communication (NFC), Magnetic Secure Transmission (MST), Radio Frequency (RF), or Body Area Network (BAN). Further, the communication unit 20 may receive the input feature map 101 and transmit the output feature map 301 through at least one wired communication interface, such as Universal Serial Bus (USB), High Definition Multimedia Interface (HDMI), Recommended Standard 232 (RS-232), power-line communication, or Plain Old Telephone Service (POTS).

In the present exemplary embodiment, the network 25 may refer to an open global computer network structure that provides various services in the TCP/IP protocol and its upper layer, i.e., Hypertext Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), and Network Information Service (NIS).

According to the exemplary embodiment, the convolution system 1000 of the convolutional neural network may further include an interface unit 60, and the interface unit 60 may include at least one of an USB, an UART, or an SD card that receives the input feature map 101 corresponding to the input data from an external device.

The central processing unit 30 may receive the input feature map 101 through the communication unit 20 or through the interface unit 60. In this case, the operation device 10 of the convolutional neural network may perform the convolution operation on the input feature map 101 based on the predetermined mosaic type 106 to output the output feature map 301.

Therefore, the central processing unit 30 may output the output feature map 301 output through the operation device 10 of the convolutional neural network. In this case, the central processing unit 30 may store the output feature map 301 in the storage unit 40, may transmit the output feature map 301 through the communication unit 20, or may display the output feature map 301 through the output unit 50.

That is, the convolution system 1000 of the convolutional neural network may be implemented by a computer, a portable terminal, a television set, or a cloud server that receives the input feature map 101 from the communication unit 20 or the interface unit 60 through the network 25 and transmits the output feature map 301.

For example, the computer may include a notebook computer, a desktop computer, or a laptop computer, which is equipped with a Web browser, and the portable terminal may be, for example, a wireless communication device that guarantees portability and mobility and may include all kinds of handheld based wireless communication devices, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT) 2000, a Code Division Multiple Access (CDMA) 2000, a W-Code Division Multiple Access (W-CDMA), a Wireless Broadband Internet (WiBro internet) Terminal, and a Smart Phone. In addition, the television set may include an Internet Protocol Television (IPTV), an Internet Television, a Terrestrial Television, a Cable Television.

In addition, the cloud server may enter output data according to the output feature map 301 into a database for each input data and may store, classify, manage, and provide the output data by using a cloud computing, distributed computing, or client-server computing technology. In this case, the cloud server may include a storage database. The storage database may be implemented for the purposes of the present disclosure using a relational database management system (RDBMS), such as Oracle, Infomix, Sybase, and DB2, or an object oriented database management system (OODBMS), such as Gemston, Orion, and O2, and may have appropriate fields to achieve its function.

Figure 9:
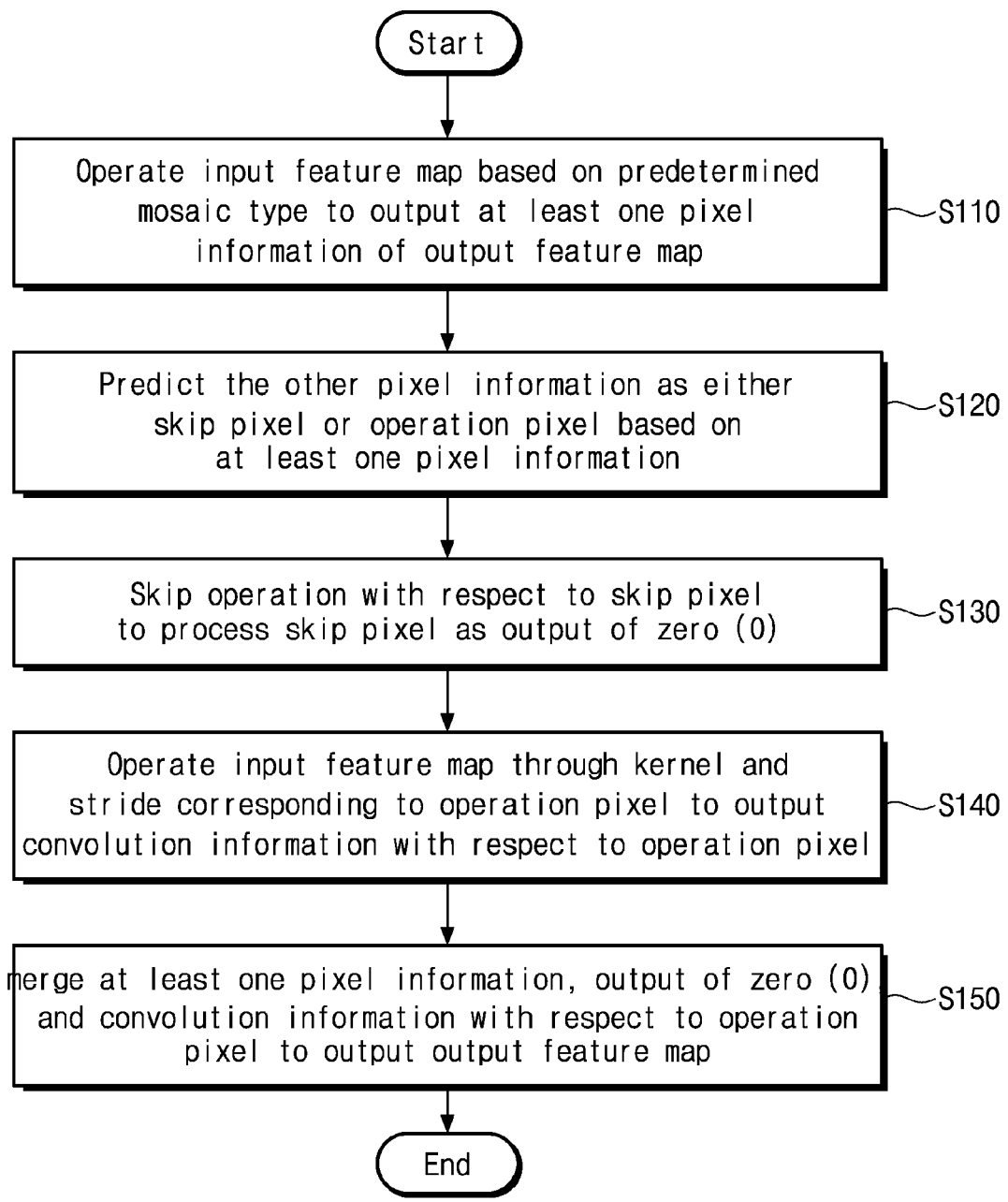
FIG. 9 is a flowchart showing an operation of an operation device of the convolutional neural network according to an exemplary embodiment of the present disclosure.

FIG. 9 is a flowchart showing an operation of the operation device 10 of the convolutional neural network according to an exemplary embodiment of the present disclosure.

Referring to FIGS. 1 to 9, in operation S110, the first operation unit 100 may perform the convolution operation on the input feature map 101 based on the predetermined mosaic type 106 and may output the at least one pixel information 102_1 to 102_N of the output feature map 301.

In operation S120, the prediction unit 200 may predict the other pixel information 103_1 to 103_N of the output feature map 301 as either the skip pixel 104_1 to 104_N or the operation pixel 105_1 to 105_N based on the at least one pixel information 102_1 to 102_N output through the first operation unit 100.

In operation S130, the second operation unit 300 may skip the convolution operation with respect to the skip pixel 104_1 to 104_N and may process the skip pixel 104_1 to 104_N as the output of zero (0) (e.g., 302).

In operation S140, the second operation unit 300 may perform the convolution operation on the input feature map 101 through the kernel 121 and the stride corresponding to the operation pixel 105_1 to 105_N and may output the convolution information (e.g., 303) with respect to the operation pixel 105_1 to 105_N among the other pixel information 103_1 to 103_N.

In operation S150, the second operation unit 300 may merge the other pixel information 103_1 to 103_N, which are obtained by merging the output of zero (0) (e.g., 302) and the convolution information (e.g., 303) with respect to the operation pixel 105_1 to 105_N, and the at least one pixel information 102_1 to 102_N output through the first operation unit 100 to output the output feature map 301.

Figure 10:
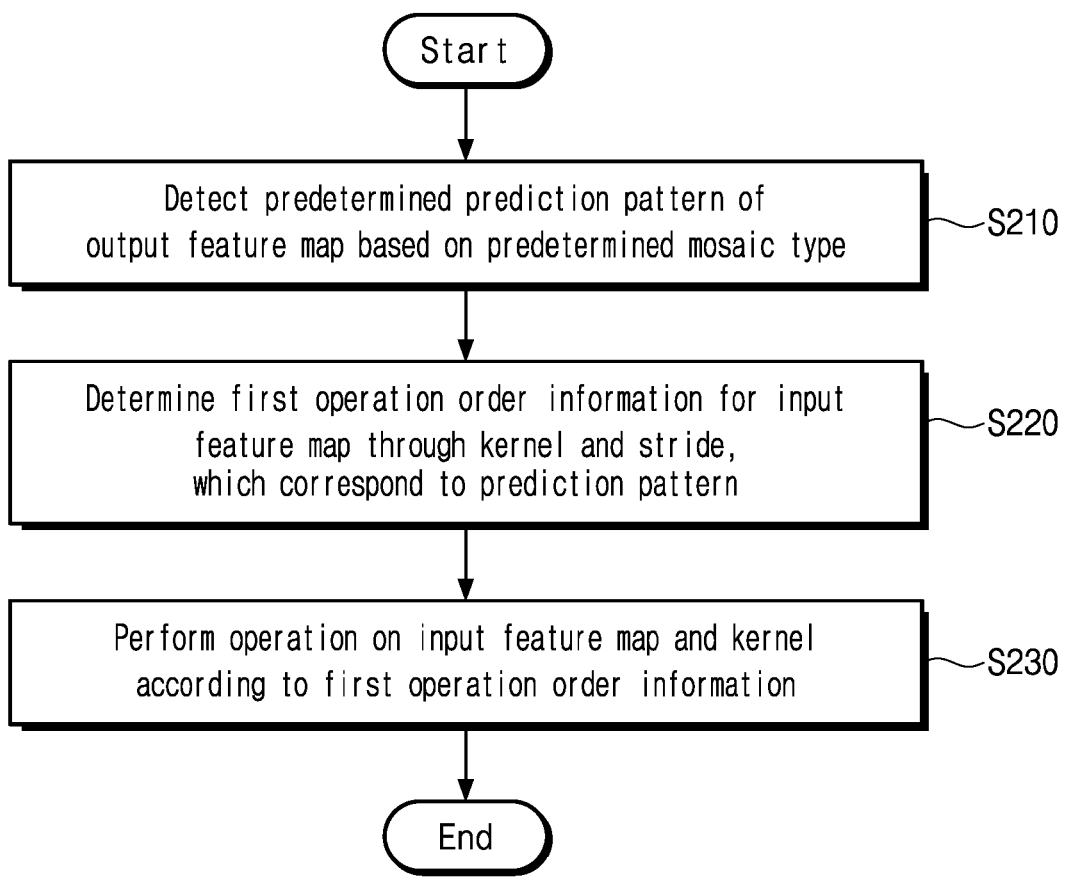
FIG. 10 is a flowchart showing an operation of the first operation unit of FIG. 1.

FIG. 10 is a flowchart showing an operation of the first operation unit 100 of FIG. 1. Referring to FIGS. 1 to 10, in operation S210, the first operation unit 100 may detect the predetermined prediction pattern (e.g., 106_1 to 106_7) of the output feature map 301 based on the predetermined mosaic type 106. For example, the first operation unit 100 may detect the predetermined prediction pattern (e.g., 106_1 to 106_7) of the output feature map 301 based on the first mosaic type.

In operation S220, the first operation unit 100 may determine the first operation order information for the input feature map 101 through the kernel 121 and the stride, which correspond to the prediction pattern (e.g., 106_1 to 106_7).

In operation S230, the first operation unit 100 may perform the convolution operation on the input feature map 101 and the kernel 121 according to the first operation order information and may output the at least one pixel information 102_1 to 102_N of the output feature map 301.

Figure 11:
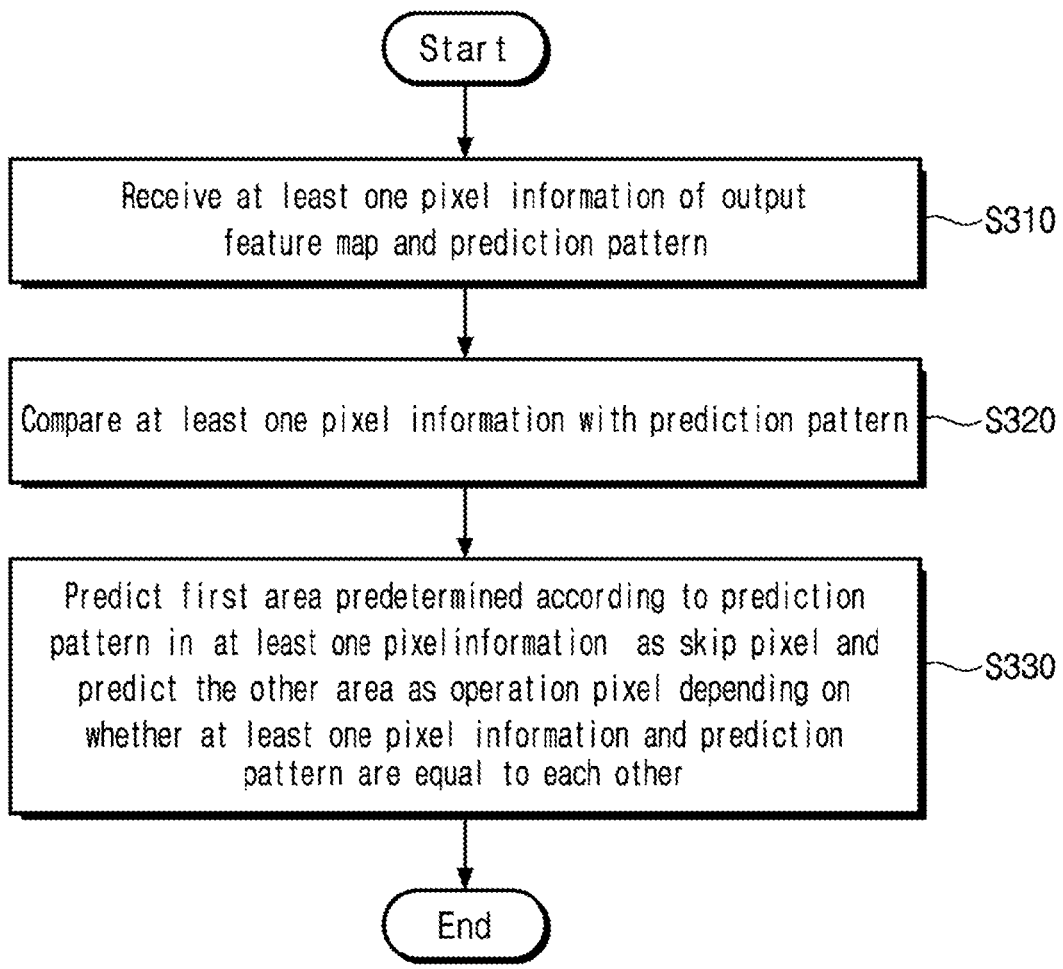
FIG. 11 is a flowchart showing an operation of a prediction unit of FIG. 1.

FIG. 11 is a flowchart showing an operation of the prediction unit 200 of FIG. 1.

Referring to FIGS. 1 to 11, in operation S310, the prediction unit 200 may receive the at least one pixel information 102_1 to 102_N and the prediction pattern (e.g., 106_1 to 106_7) from the first operation unit 100.

In operation S320, the prediction unit 200 may compare the at least one pixel information 102_1 to 102_N with the prediction pattern (e.g., 106_1 to 106_7).

In operation S330, the prediction unit 200 may predict the predetermined first area 104 in the other pixel information 103_1 to 103_N as the skip pixel 104_1 to 104_N and may predict the other area 105 as the operation pixel 105_1 to 105_N depending on whether the output of zero (0) of the at least one pixel information 102_1 to 102_N and the prediction pattern (e.g., 106_1 to 106_7) are equal to each other.

That is, the prediction unit 200 may compare the output of zero (0) of the at least one pixel information 102_1 to 102_N with the output of zero (0) of the prediction pattern (e.g., 106_1 to 106_7) and may distinguish the first area 104 from the other area 105 for the other pixel information 103_1 to 103_N depending on the compared result.

FIG. 12 is a flowchart showing an operation of the second operation unit 300 of FIG. 1.

Referring to FIGS. 1 to 12, in operation S410, the second operation unit 300 may process the skip pixel 104_1 to 104_N predicted by the prediction unit 200 among the other pixel information 103_1 to 103_N as the output of zero (0) (e.g., 302).

In operation S420, the second operation unit 300 may determine the second operation order information for the input feature map 101 through the kernel 121 and the stride, which correspond to the operation pixel 105_1 to 105_N predicted by the prediction unit 200, among the other pixel information 103_1 to 103_N.

In operation S430, the second operation unit 300 may perform the convolution operation on the input feature map 101 and the kernel 121 according to the second operation order information and may output the convolution information (e.g., 303) with respect to the operation pixel 105_1 to 105_N.

In operation S440, the second operation unit 300 may merge the output of zero (0) (e.g., 302) and the convolution information (e.g., 303) for the operation pixel 105_1 to 105_N to output the other pixel information 103_1 to 103_N of the output feature map 301.

In operation S450, the second operation unit 300 may merge the at least one pixel information 102_1 to 102_N of the output feature map 301 output through the first operation unit 100 and the other pixel information 103_1 to 103_N of the output feature map 301 to output the output feature map 301.

Although the embodiments of the present disclosure have been described with reference to the accompanying drawings, the present disclosure should not be limited to the above-illustrated embodiments, and various kinds of modifications and variations may be added to the embodiments within the same or equal scope of the present disclosure by one skilled in the art. However, even if the working effect of the invention is not disclosed in the specification, the effect still can be considered in assessing inventiveness if the effect can be inferred from the descriptions in the specification.

What is claimed is:

1. An operation device of a convolutional neural network, comprising:
   a first operator performing a convolution operation on an input feature map based on a predetermined mosaic type to output at least one pixel information of an output feature map;
   a predictor predicting the other pixel information of the output feature map as one of a skip pixel and an operation pixel based on the at least one pixel information; and
   a second operator skipping the convolution operation with respect to the skip pixel to process the skip pixel as an output of zero.

2. The operation device of claim 1, wherein the first operator detects a predetermined prediction pattern based on the predetermined mosaic type.

3. The operation device of claim 2, wherein the first operator determines first operation order information for the input feature map through a kernel and a stride, which correspond to the prediction pattern, and the first operation order information are operation order information for the stride determined according to the prediction pattern.

4. The operation device of claim 3, wherein the first operator performs a convolution operation on the input feature map and the kernel according to the first operation order information to output the at least one pixel information of the output feature map.

5. The operation device of claim 3, wherein, when a convolution operation is performed on a most significant bit of the input feature map and a filter coefficient predetermined in the kernel, the first operator performs a convolution operation on lower bits of the input feature map and the predetermined filter coefficient to weight the operated result with a correction constant.

6. The operation device of claim 1, further comprising a sparse matrix accelerator that performs a convolution operation on a next input feature map newly generated based on the output of zero of the output feature map, wherein the sparse matrix accelerator performs the convolution operation on the next input feature map through a kernel and a stride, which correspond to the pixel information except for the output of zero in the output feature map.

7. The operation device of claim 2, wherein the predictor predicts a first area of an output information, which is predetermined according to the prediction pattern, as the skip pixel depending on whether an output pattern of zero of the at least one pixel information is equal to the prediction pattern.

8. The operation device of claim 2, wherein the at least one pixel information is a $C_{NM}$ pixel matrix operated according to the prediction pattern, "C" denotes a pixel matrix corresponding to the output feature map, "N" denotes position information on an X-axis of the pixel matrix, and "M" denotes position information on a Y-axis of the pixel matrix.

9. An operation method of an operation device of a convolutional neural network, comprising:
    performing a convolution operation on an input feature map based on a predetermined mosaic type to output at least one pixel information of an output feature map;
    predicting the other pixel information of the output feature map as one of a skip pixel and an operation pixel based on the at least one pixel information; and
    skipping the convolution operation with respect to the skip pixel to process the skip pixel as an output of zero.

10. The operation method of claim 9, further comprising:
    performing a convolution operation on the input feature map through a kernel and a stride, which correspond to the operation pixel, to output convolution information for the operation pixel; and
    merging the output of zero, the at least one pixel information, and the convolution information with respect to the operation pixel to output the output feature map.

11. The operation method of claim 9, wherein the outputting of the at least one pixel information comprises:
    detecting a predetermined prediction pattern based on the predetermined mosaic type;
    determining first operation order information for the input feature map through a kernel and a stride, which correspond to the prediction pattern; and
    performing a convolution operation on the input feature map and the kernel according to the first operation order information.

12. The operation method of claim 10, wherein the predicting of the other pixel information comprises:
    comparing the at least one pixel information with the prediction pattern;
    predicting a first area of the other pixel information, which is predetermined according to the prediction pattern, as the skip pixel depending on whether the at least one pixel information are equal to the prediction pattern; and
    predicting the other area of the other pixel information as the operation pixel.

13. The operation method of claim 10, wherein the processing of the skip pixel as the output of zero comprises:
    determining second operation order information for the input feature map through kernel and the stride, which correspond to the operation pixel;
    performing a convolution operation on the input feature map and the kernel according to the second operation order information to output the convolution information for the operation pixel;
    outputting the other pixel information based on the convolution information for the operation pixel; and
    merging the at least one pixel information and the other pixel information to output the output feature map.

* * * * *